United States Patent [19]
Lamport et al.

[11] 3,772,930
[45] Nov. 20, 1973

[54] METAL BELT DRIVE

[75] Inventors: Ivan R. Lamport, East Peoria; Francis J. Rother, Morton; Calvin D. Loyd, Peoria, all of Ill.

[73] Assignee: Caterpillar Tractor Co., Peoria, Illinois

[22] Filed: Dec. 22, 1971

[21] Appl. No.: 210,678

[52] U.S. Cl. .............................................. 74/231 M
[51] Int. Cl. ................................................ F16g 1/00
[58] Field of Search ................... 74/231 M, 230.5, 74/231 R, 230.01

[56] References Cited
UNITED STATES PATENTS

| 3,156,126 | 11/1964 | Olsen | 74/231 M |
| 3,208,297 | 9/1965 | Woods | 74/231 M |
| 380,077 | 3/1888 | Barrie | 74/230.01 |
| 2,801,547 | 8/1957 | Guibert | 74/231 R |
| 3,642,120 | 2/1972 | Duhan | 74/231 R |

FOREIGN PATENTS OR APPLICATIONS

| 5,354 | 0/1893 | Great Britain | 74/231 M |
| 1,210,754 | 10/1970 | Great Britain | 74/230.5 |
| 695,666 | 8/1953 | Great Britain | 74/230.01 |

*Primary Examiner*—Charles J. Myhre
*Assistant Examiner*—R. H. Lazarus
*Attorney*—Warren J. Krauss

[57] ABSTRACT

A positive traction belt drive having a belt made from beryllium-copper metal and having apertures which are drivingly engaged by dowels on the periphery of a pulley. The belt engaging periphery of the pulley is crowned to reduce belt wear and provide for improved tracking.

6 Claims, 2 Drawing Figures

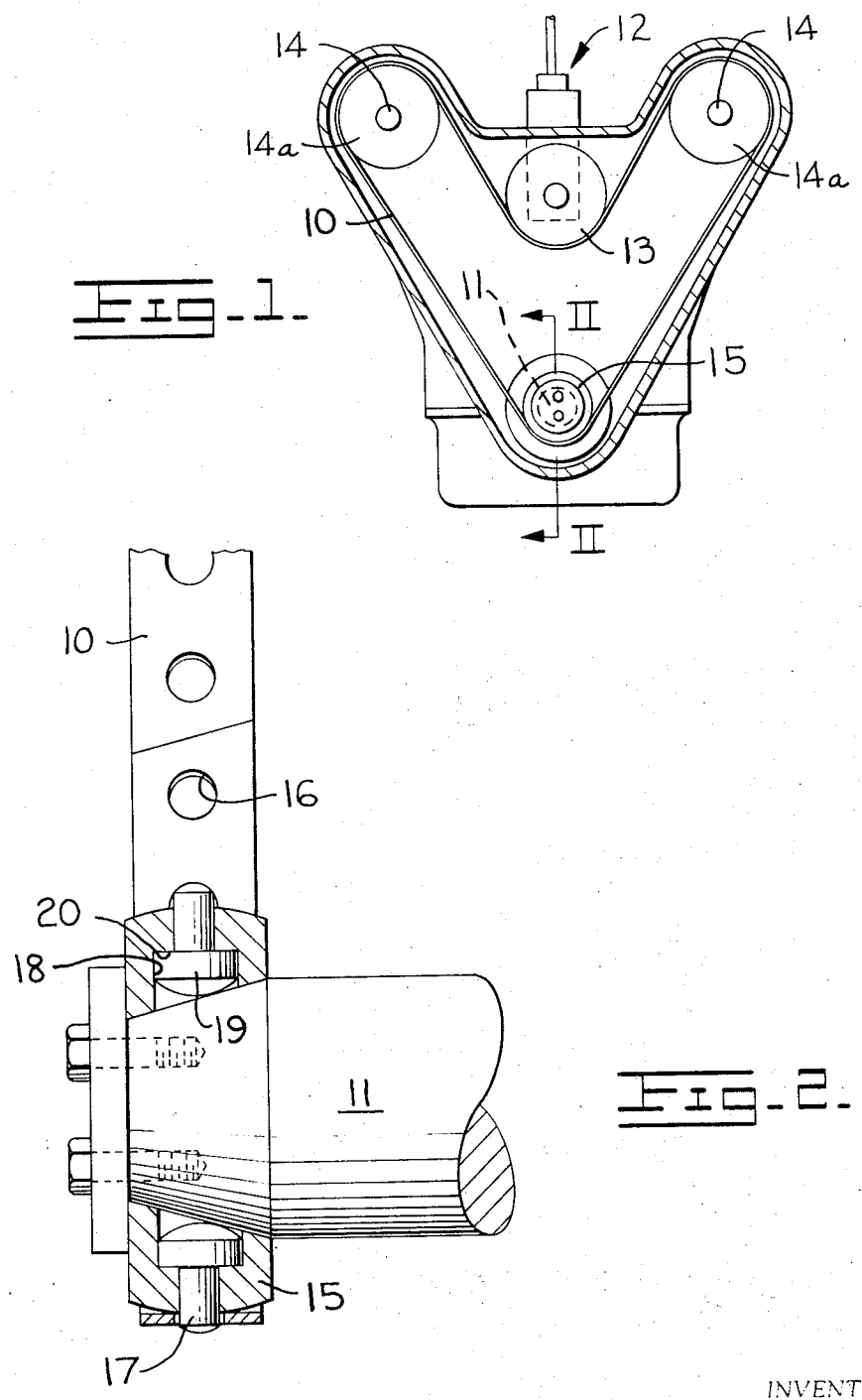

METAL BELT DRIVE

BACKGROUND OF THE INVENTION

This invention relates to a new and improved metal belt drive. More particularly, the invention is directed to a new positive traction belt drive for specific use as a drive means for accessories on engines or machines which operate in an oil-laden environment.

Economical and efficient drive means for engine components such as fuel pumps, overhead cam shafts, generators and the like have been ambitiously sought.

Chain drives have been used but these usually tend to be noisy as well as costly. Gear train drives have also been used, but these carry the disadvantages of being susceptible to backlash in addition to being extremely expensive. Cog belts, made of resilient material such as rubber or plastic, would be efficient except that they cannot be used in an oil-laden environment without deterioration. Also, these belts are subject to wear failure after relatively short cycling periods.

This invention is principally directed to positive traction belt drive which is not subject to the above-mentioned problems and which is inexpensive to fabricate and which has an extremely long service life.

One of the objects of this invention is to provide a drive belt made of a metal which has a very low modulus of elasticity and consequent low bending stress, compared to steel, when in use over a pulley of a given diameter.

Another object of this invention is to provide a belt which can be fabricated from sheet strips of metal electron-beam welded together.

Yet another object of this invention is to provide a metal belt which can be cut as annular bands from available seamless tubing.

Another object of this invention is to provide a belt drive wherein the pulleys have crowned peripheries to provide favorable wear and tracking characteristics.

Still another object of the present invention is to provide a pulley which contains dowels which are readily replaceable and inexpensive.

Still another object of this invention is to provide a metal belt which is uniformly perforated for accurate timing of a driven device.

Other objects and advantages of the present invention will become apparent from the following description and claims. The accompanying drawings show, by way of illustration, the preferred embodiments of the present invention and the principles thereof which are considered to be the best mode contemplated for utilizing these embodiments. It is recognized that other embodiments of the invention which utilize the same or equivalent principles may be used and structural changes may be made as desired by those skilled in the art without departing from the present invention and the purview of the appended claims.

BRIEF DESCRIPTION OF THE DRAWINGS

FIG. 1 is a schematic frontal elevation of an engine utilizing the present invention;

FIG. 2 is a cross-sectional view taken along the lines II—II of FIG. 1 and shows an embodiment of the pulley and metal belt means of the present invention.

DETAILED DESCRIPTION OF THE INVENTION

FIG. 1 shows a schematic representation of an engine having accessories which are driven by the metal belt drive constructed in accordance with the principles of the present invention. The metal belt drive is shown to be driven by a pulley 15 mounted on the engine crankshaft 11. A fuel pump 12 and camshafts 14, mounted on the engine are driven by the belt drive through pulleys 13 and 14a, respectively.

As shown in FIG. 2, the novel metal belt 10 of the present invention is received upon a shaft-driven pulley 15 which is removably mounted upon the crankshaft 11 by bolts or other convenient attachment means. The pulley 15 is a hollow annulus and is counterbored in a plurality of positions as shown at 18. A dowel 17 which has an enlarged head portion indicated at 19 is inserted in the pulley prior to the installation of same upon the shaft 11. When assembled, the dowel head 19 abuts firmly against the counterbore shoulder 20 and is held in that position by the shaft 11. To one skilled in the art, it will be apparent that other means could be used to retain the dowels 17 in operative position. However, the arrangement shown in FIG. 2 is preferred because it affords facile replacement of the worn dowels, when necessary.

The metal belt 10 is provided with evenly-spaced apertures 16 which mate with the dowels 17, as shown in FIG. 2. These apertures provide for non-slip accurate timing of the belt drive. The peripheral edge of the pulley 15 is crowned. This has been found to improve belt tracking and reduce wear.

The invention contemplates the use of metal for fabrication of the belt. Inter alia, this enables the use of the belt in the oil-laden environment of an engine crankcase, without deterioration. Also, because of high bending stresses encountered, especially when pulleys of small diameter are utilized in the arrangement, metals which have a low modulus of elasticity are particularly desirable. Applicants have found unexpectedly good performance with metals having a lower modulus of elasticity than steel. New and unexpected results were obtained when beryllium-copper alloy was used. Testing showed that this metal, with a modulus of elasticity of 19,000,000 psi, has exceptional endurance to bending stress. When compared with a comparable belt of equivalent thickness made from spring steel and run over the same pulley system, the beryllium-copper belt ran some 12 to 16,000,000 cycles before testing was terminated. The steel belt failed after some ½ million cycles.

The metal belt used in the present invention can be fabricated from flat strips of the metal cut and perforated and electron-beam welded together at an angle joint or butt welded at a flat joint. Because welding tends to produce soft regions on each side of the weld joint, it is preferred that a heat treat be applied to the region. If a heat treatment of 600° F. for at least one hour is applied to these regions the soft areas on each side of the weld joint will return to the original hardness of the belt metal. Of the two weld methods, the electron-beam weld method is preferred.

The belts can also be fabricated from cut sections of commercially-available seamless metal tubing.

It should be noted that although the novel metal belt drive of the instant invention has been described herein in relation to an engine and its accessories, it is apparent that said belt drive has utility in any other suitable environment.

While the preferred embodiments of the invention have been illustrated and described, it is to be understood that these embodiments are capable of variation and modification and are not limited to the precise details set forth herein, but rather include such variations and modifications as fall within the scope of the appended claims.

I claim:

1. In a positive traction belt drive comprising, the combination of a hollow pulley means having a peripheral edge and two parallel side portions and a flexible metallic belt means drivingly engaging said peripheral edge, said belt means having perforations uniformly spaced apart along the length thereof, said pulley means including a plurality of apertures in said peripheral edge, dowel means mounted within each of said apertures for cooperatively engaging said belt means perforations, said dowel means each having an enlarged head portion and a stem portion, each said stem portion traversing one of said apertures from the hollow interior of said pulley means to the radially spaced-apart exterior portion of said peripheral edge, each said enlarged head portion of said dowel means being operatively in contact with a portion of said hollow interior of said pulley means to prevent said dowel means for passing completely radially outwardly through said apertures.

2. The positive traction belt drive of claim 1; wherein said belt means is fabricated from a flat strip of metal joined by means of an electron-beam weld.

3. The positive traction belt drive of claim 1; wherein said belt is fabricated from seamless tubing.

4. The positive traction belt drive of claim 1; wherein said metallic belt is fabricated from beryllium-copper alloy.

5. The positive traction belt drive of claim 1; wherein said peripheral edge is crowned to provide improved belt tracking and reduced wear.

6. The positive traction a belt drive of claim 1 including shaft means for said pulley means, said dowel means being removably installed through said peripheral edge of said pulley means and being restrained from moving radially inwardly within said apertures by means of engagement between said enlarged head portions and said shaft means.

* * * * *